United States Patent [19]
Yoshizaki et al.

[11] Patent Number: 5,843,558
[45] Date of Patent: Dec. 1, 1998

[54] LAMINATED STRUCTURE OF FIBER REINFORCED PLASTICS AND SHOCK-ABSORBING STRUCTURE

[75] Inventors: Yuichi Yoshizaki; Toru Fujihira, both of Wako, Japan

[73] Assignee: Honda Giken Kogyo Kabushiki Kaisha, Tokyo, Japan

[21] Appl. No.: 575,794

[22] Filed: Dec. 22, 1995

[30] Foreign Application Priority Data

Dec. 26, 1994 [JP] Japan ..................................... 6-323101
Jan. 23, 1995 [JP] Japan ..................................... 7-008105

[51] Int. Cl.$^6$ ........................................................ B32B 5/12
[52] U.S. Cl. ........................ 428/112; 428/114; 244/119; 244/121
[58] Field of Search ................................... 428/113, 114, 428/902, 112; 244/119, 121

[56] References Cited

U.S. PATENT DOCUMENTS

| | | | |
|---|---|---|---|
| 4,157,101 | 6/1979 | Ross ........................................ | 138/130 |
| 4,173,128 | 11/1979 | Corvelli .................................... | 64/1 S |
| 4,412,474 | 11/1983 | Hara ........................................ | 87/6 |
| 4,593,870 | 6/1986 | Cronkhite et al. ................... | 244/117 R |
| 4,759,147 | 7/1988 | Pirazzini ................................. | 43/18.5 |
| 4,946,721 | 8/1990 | Kindervater et al. ................. | 428/36.1 |
| 5,069,318 | 12/1991 | Kulesha et al. ......................... | 188/377 |
| 5,437,905 | 8/1995 | Park ........................................ | 428/105 |

FOREIGN PATENT DOCUMENTS 5115880 of 0000 Japan .
5884825 of 0000 Japan .

OTHER PUBLICATIONS

J.D. Cronkhite, V.L. Berry, "Crashworthy Airframe DEsign Concepts Fabrication and Testing", NASA Contractor Report 3603, 1982.
Extract, "Shock Absorbing Structure in an Airplane", Japanese with English translation.

*Primary Examiner*—Christopher Raimund
*Attorney, Agent, or Firm*—Lyon & Lyon LLP

[57] ABSTRACT

A carbon-fiber reinforced plastic sheet is excellent in tensile strength and modulus of elasticity, but defective in impact resistance and fracture toughness. To overcome the defect, two aramid fiber reinforced plastic sheets are adhered to the opposite surfaces of the carbon-fiber reinforced plastic sheet to thereby provide a laminated structure and the aramid fibers are skewed at angles of +30° to +60° with respect to the direction of an impact load. This arrangement exhibits an improved shock absorbing efficiency and eliminates surface distortion which would otherwise take place during lamination. Further, a shock-absorbing structure may be produced from combining a plurality of sheets assembled crosswise such that surfaces of the respective sheets lie parallel to the direction of the impact load, and a cutout recess and a bulged portion are formed at an end of at least one sheet adjacent an intersection of the structure. Thus, the one end of the sheet including the cutout recess and the bulged portion undergoes local buckling initiating from the intersection, and thereafter the entire assembly is caused to become buckled. Since complete buckling of the entire structure takes a certain period of time, the impact energy can be absorbed with a reduction of the peak load, whereby the shock-absorbing structure is suitable for use in a crushable zone in aircrafts, automobiles or the like.

15 Claims, 14 Drawing Sheets

FIG. 7

| | AL | CFRP | KFRP | GFRP | CF/KF | CF/GF |
|---|---|---|---|---|---|---|
| MATERIALS | A2024T3 | CFRP (HMFJ3113/Al) | KFRP (HM×M7714 A285K) | GFRP (M×B7701/1581) | CFRP/KFRP | CFRP/GFRP |
| PANEL LAMINATION PATTERN | | CF±45°<br>CF 0°、90°<br>CF 0°、90°<br>CF±45° | KF±45°<br>KF 0°、90°<br>KF 0°、90°<br>KF 0°、90°<br>KF±45° | GF±45°<br>GF 0°、90°<br>GF 0°、90°<br>GF 0°、90°<br>GF±45° | KF±45°<br>CF 0°、90°<br>CF 0°、90°<br>CF 0°、90°<br>KF±45° | GF±45°<br>CF 0°、90°<br>CF 0°、90°<br>CF 0°、90°<br>GF±45° |
| STIFFENER LAMINATION PATTERN | | CF±45°<br>CF 0°、90°<br>CF 0°、90°<br>CF 0°、90°<br>CF±45° | KCF±45°<br>KF 0°、90°<br>KF 0°、90°<br>KF 0°、90°<br>KF±45° | GF±45°<br>GF 0°、90°<br>GF 0°、90°<br>GF 0°、90°<br>GF±45° | KF±45°<br>CF 0°、90°<br>CF 0°、90°<br>CF 0°、90°<br>KF±45° | GF±45°<br>CF 0°、90°<br>CF 0°、90°<br>CF 0°、90°<br>GF±45° |
| PANEL THICKNESS (mm) | 0.8 | 0.92 | 1.15 | 1.25 | 1.15 | 1.19 |
| STIFFENER THICKNESS (mm) | 1.0 | 1.15 | 1.38 | 1.5 | 1.38 | 1.42 |
| STIFFENER HEIGHT (mm) | 17.0 | 19.5 | 22.5 | 25.0 | 18.5 | 18.5 |
| GEOMETRICAL MOMENT OF INERTIA (mm) | 3556 | 6162 | 11421 | 16976 | 6502 | 6719 |
| MODULUS OF LONGITUDINAL ELASTICITY (kg/mm$^2$) | 7500 | 4464 | 2395 | 1594 | 4241 | 4057 |
| FLEXUAL RIGIDITY (kg/mm$^2$) | $2.67 \times 10^7$ | $2.75 \times 10^7$ | $2.73 \times 10^7$ | $2.70 \times 10^7$ | $2.76 \times 10^7$ | $2.72 \times 10^7$ |
| WEIGHT (g) | 238 | 146 | 169 | 208 | 166 | 180 |

LAMINATED STRUCTURE OF FIBER REINFORCED PLASTICS AND SHOCK-ABSORBING STRUCTURE

FIELD OF THE INVENTION

The present invention relates to a plastic laminated structure effective to absorb impact energy exerted on an aircraft, for example, when it makes a landing, and a shock-absorbing structure for a portion below the floor of a body or airframe structure of the aircraft in which fiber reinforced plastics are used as materials for the airframe. More particularly, it relates to such a structure which is effective to lower the peak load.

BACKGROUND OF THE INVENTION

A laminated structure, such as a composite material, used as a material for aircraft or the like, is produced by a conventional technique in which fiber reinforced plastic sheets are bonded to the face and the back of a honeycomb panel, as disclosed in Japanese Patent Laid-Open Publication No. 58-84825.

Japanese Patent Publication No. 51-15880 discloses another prior technique according to which fiberglass reinforced thermoplastic sheets are adhered to the face and back of a carbon-fiber reinforced plastic sheet.

In general, airplanes, helicopters and the like are provided with a crushable zone located below the floor surface. To protect a body or airframe of the aircraft from being destructively damaged by impact energy, the crushable zone includes a shock-absorbing structure for absorbing a shock or impact, such as disclosed in U.S. Pat. Nos. 5,069,318 and 4,593,870 and NASA-Contractor Report 3603. Various other shock-absorbing structures, such as a square-tube-contained honeycomb panel structure, a sine-wave-beam structure and a double-layered honeycomb panel structure, are also shown in "Researches in Shock-Absorbing Structure of Aircraft", March 1990, reported as the result of joint research made by Kawasaki Heavy Industries. Ltd., Sumitomo Precision Products Co., Ltd. and Tenryu Industries Co., Ltd., and entrusted by The Society of Japan Aerospace Companies, Inc.

It is desirable that these shock-absorbing structures do not incur an increase or gain in the airframe weight, can efficiently absorb impact energy, and are capable of lowering the peak load. From this point of view, a sock-absorbing structure such as shown in FIG. 17 has been used heretofore.

The shock-absorbing structure shown in FIG. 17 comprises an assembly composed of a keel 51 and ribs 52 crossing each other and both are made of an aluminum alloy. Intersections 53 of the assembly each include a joint corner member or piece 54 having a plurality of notched holes or openings 55 arranged in a vertical direction such that stress concentration takes place at the joint corner piece 54 when the assembly is subjected to an impact load applied vertically and downwardly via a floor or the like overlying the assembly. With this arrangement, when the shock-absorbing structure is subjected to an impact load exceeding a predetermined value, planned buckling is caused at the intersection 53 due to the presence of the notched openings 55, thus absorbing the impact energy.

The fiber reinforced plastics used as a structural material for the aircraft and the like can provide the advantage of lowering the weight of the airframe. However, the joint corner piece having the aforesaid shock-absorbing structure composed of the notched openings cannot provide a sufficient shock-absorbing effect. Furthermore, this structure can stand improvement in lowering the peak load. Stated more specifically, when the aircraft is subjected to an impact load tending to cause structural destruction of the aircraft, the load value immediately goes up to a peak value and thereafter settles down to a value lower than the peak value. The peak load should preferably be as low as possible from the viewpoint of passenger protection. However, the notched openings formed in the fiber reinforced plastic joint corner piece can only provide a limited reduction of the peak load.

The present invention has been conceived by the present inventors so as to solve the foregoing problems.

It is generally understood that the carbon-fiber reinforced plastic is excellent in tensile strength and modulus of elasticity, on one hand, but defective in impact resistance and fracture toughness, on the other hand.

SUMMARY OF THE INVENTION

A first object of this invention is to overcome the foregoing deficiency by using aramid fiber reinforced plastics for increasing the impact energy absorption efficiency to thereby improve the impact resistance.

A second object of this invention is to control the peak load as much as possible to thereby lower the same from the viewpoint of protection of aircraft passengers, for example, even when the aircraft is subjected to an impact load tending to cause structural destruction of the aircraft.

According to a first aspect of the present invention, there is provided a laminated structure which is composed of a carbon-fiber reinforced plastic sheet adapted to be arranged with its opposite surfaces lying parallel to the direction of an impact load, and a pair of aramid fiber reinforced plastic sheets adhered to the opposite surfaces of the carbon-fiber reinforced plastic sheet such that aramid fibers in the aramid fiber reinforced plastic sheets are skewed at angles of +30° to +60° with respect to the direction of the impact load.

As described above, the carbon-fiber reinforced plastic is excellent in tensile strength and modulus of elasticity, but defective in impact resistance and fracture toughness, These defects can be overcome by the use of the aramid fiber reinforced plastic. In this instance, the direction of the aramid fibers is skewed at an angle of +30° to +60° with respect to the direction of the impact load. It was found that this arrangement makes it possible to improve the impact energy absorbing efficiency and eliminate surface distortion which would otherwise occur during lamination. Preferably, the skewed angle of the aramid fibers is substantially +45°. The laminated structure of this invention is composed of a composite material and hence can be reduced in weight, and accordingly it is particularly suitable for use in aircraft.

In a second aspect, the present invention provides a shock-absorbing structure which comprises a plurality of sheets assembled crosswise such that surfaces of the respective sheets are in parallel with the direction of an impact load, wherein the assembled sheets have a cutout recess and a bulged portion formed in at least one of the sheets at an end adjacent to an intersection of the assembled sheets and located at at least one side of the shock-absorbing structure (edge of the sheet).

Owing to the cutout recess and the bulged portion provided at the sheet end, local buckling is caused to be initiated from the sheet end and subsequently the entire structure is caused to become buckled. Since complete buckling of the entire structure takes a certain period of time, the impact energy can be absorbed by the structure being buckled during that period of time. In point of lowering the peak load, the structure having the cutout recess and the bulged portion is also effective even when the structure is made of an aluminum alloy.

In the shock-absorbing structure, each of the sheets can be composed of a laminated structure of fiber reinforced plastics. The resulting structure has an improved energy absorption efficiency as compared to a structure composed of a plurality of sheets simply assembled crosswise and a similar structure composed of a plurality of sheets assembled crosswise with notched openings formed at the corner of a joint.

The laminated structure may be composed of a carbon-fiber reinforced plastic and a pair of aramid fiber reinforced plastic sheets adhered to the opposite sides of the carbon-fiber reinforced plastic such that carbon fibers in the carbon-fiber reinforced plastic are aligned with the direction of the impact load and the aramid fibers in at least one of the aramid fiber reinforced plastic sheets are skewed at angles of +30° to +60° with respect to the direction of the impact load.

The shape of the cutout recess may include a rectangular shape, a triangular shape and an arcuate shape. The bulged portion preferably has an oval shape with its minor axis aligned with the direction of the impact load, or an arcuate shape with its minor axis aligned with the direction of the impact load, so that the buldged portion is liable to cause or initiate local buckling.

The shock-absorbing structure, when used in a crushable zone in an aircraft, for example, can provide a substantial weight reduction of the airframe and an effective degree of impact resistance.

BRIEF DESCRIPTION OF THE DRAWINGS

FIGS. 1A, 1B and 1C show a laminated structure according to the present invention, in which FIG. 1A is a perspective view of the laminated structure before lamination is performed, FIG. 1B is an explanatory view illustrative of the direction of fibers provided after lamination is achieved, and FIG. 1C is a cross-sectional view of the laminated structure.

FIG. 7 is a table showing the specification of various test samples.

FIGS. 10A, 10B and 10C show another embodiment of the laminated structure, in which FIG. 10A is a perspective view of the laminated structure before lamination is achieved, FIG. 10B is an explanatory view illustrative of the direction of fibers provided after lamination is achieved, and FIG. 10C is a cross-sectional view of the laminated structure.

DETAILED DESCRIPTION OF THE INVENTION

Figure 1A:
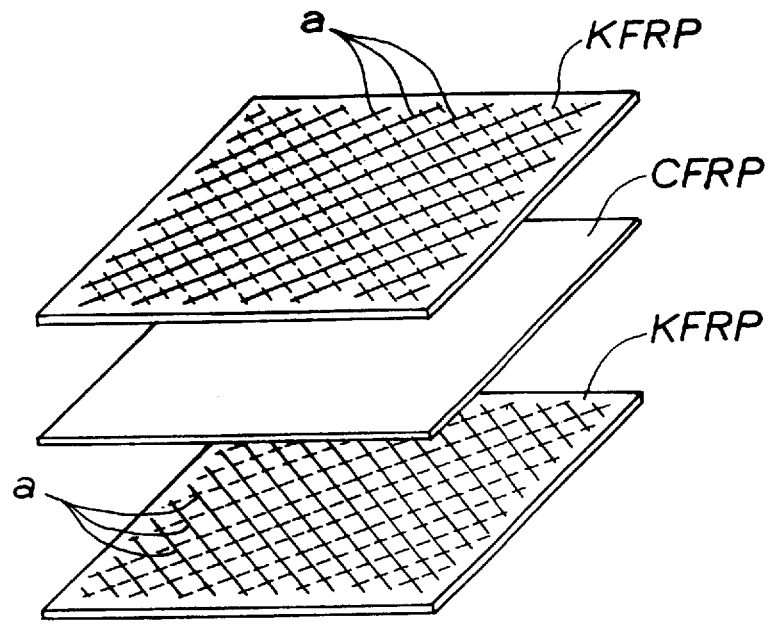
Figure 1B:
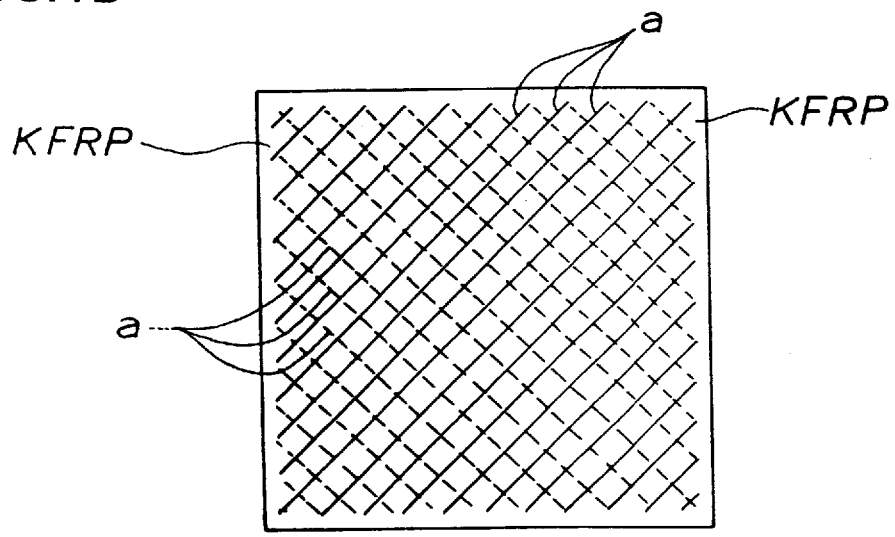
Figure 1C:
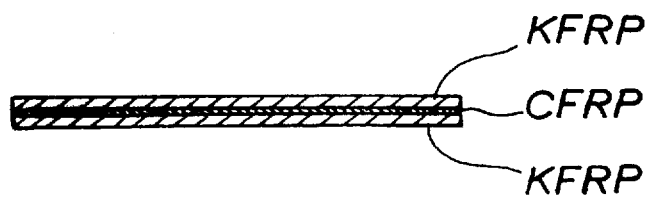
Figure 2:
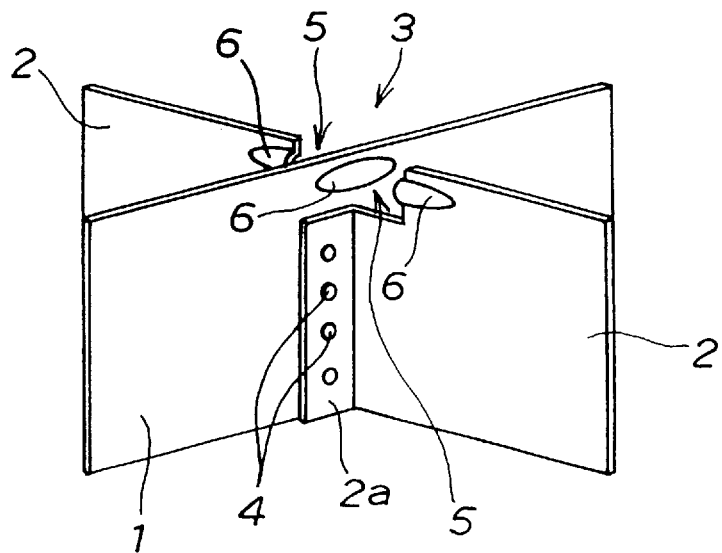
FIG. 2 is a perspective view showing one structural embodiment of the laminated structure of this invention as it is used in a shock-absorbing structure disposed below the floor of an aircraft.
Figure 3:
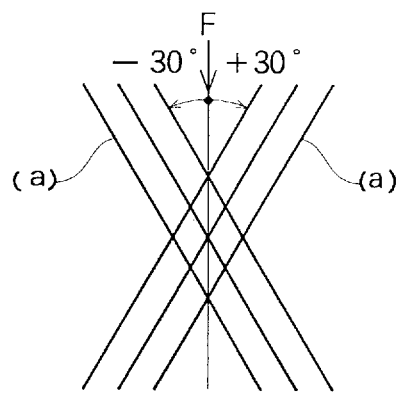
FIG. 3 is an explanatory view showing the relation between the direction of aramid fibers and the direction of an impact load.

Certain preferred embodiments of the present invention will be described below in greater detail with reference to the accompanying sheets of drawings, in which FIGS. 1A, 1B and 1C illustrate a laminated structure according to the present invention, wherein FIGS. 1A and 1B are explanatory views showing the directions of fibers, respectively, before and after the lamination is achieved, and FIG. 1C is a cross-sectional view of the laminated structure; FIG. 2 is a view showing a first structural embodiment of the shock-absorbing structure according to the present invention; and FIG. 3 is an explanatory view showing the relation between the direction of aramid fibers and the direction of an impact force.

The laminated structure of this invention is used in a shock-absorbing structure located below the floor of an aircraft and the structural material is composed of a composite material, and it is so constructed to absorb impact energy when a great vertical shock or impact is applied thereto.

A portion located below the floor of the aircraft includes a keel 1 composed of a fiber reinforced plastic (hereinafter referred to as "FRP") and two confronting ribs 2 composed of an FRP and assembled with the keel 1 in such a manner that opposite side surfaces of the keel 1 and the opposite side surfaces of each of the ribs 2 extend vertically and in parallel with the direction of a load, as shown in FIG. 2. The FRPs each have a laminated structure which is composed, as shown in FIG. 1, of a central carbon-fiber reinforced plastic (hereinafter referred to as "CFRP") and two outside aramid fiber reinforced plastic sheets (hereinafter referred to as "KFRPs") adhered or otherwise bonded to the opposite sides of the CFRP. The laminated structure is constructed such that the direction of carbon fibers in the central CFRP is vertical and parallel to the direction of the load, while in the KFRPs between which the CFRP is sandwiched, the direction of the aramid fibers (a) is skewed at angles of +30° to +60° relative to the direction of the load.

The laminated structure of FRP used in constructing the shock-absorbing structure enables the KFRP layers to control or restrain rapid growth of cracks which would otherwise occur in the CFRP layer when the laminated structure is subjected to an impact load. It is, therefore, possible to enlarge the compressively destructible area in the CFRP layer which is generally weak in resistance to the impact load.

The aramid fibers (a) exhibit a high impact-energy absorbing efficiency when they are arranged obliquely or skewed at angles ranging from +30° to +60° relative to the direction of the impact load. However, in the case of the illustrated preferred embodiment (FIG. 1B), the direction of the aramid fibers is skewed at approximately +45°. In another preferred embodiment shown in FIG. 3, the direction of the aramid fibers (a) is skewed at angles of +30° relative to the direction F of an impact load.

Since the direction of the aramid fibers in one KFRP layer and the direction of the aramid fibers in the other KFRP layer are skewed at the same angle, the CFRP layer can be laminated with the KFRP layers in sandwiched relation without involving any sort of surface distortion.

Figure 4:
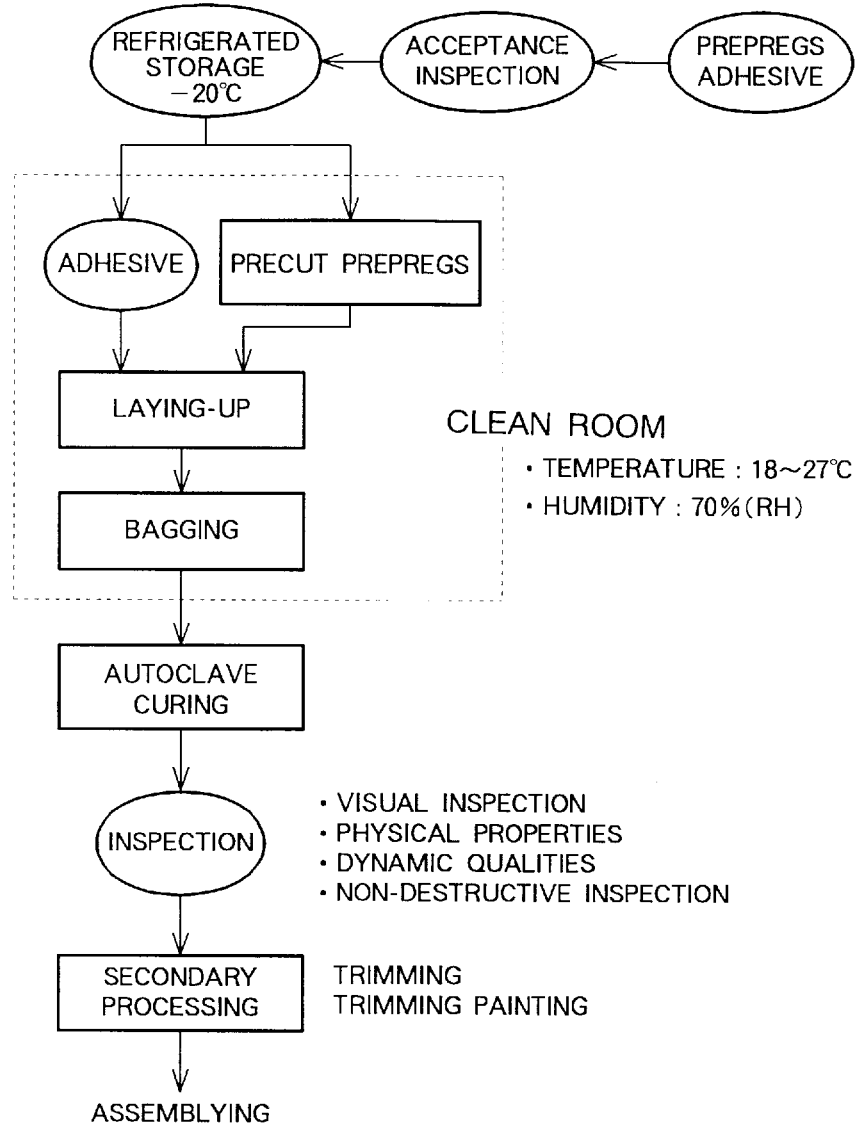
FIG. 4 is a flowchart showing a process for producing the laminated structure.

Now, a method of producing the foregoing laminated structure will be described below in brief with reference to FIG. 4. At first, a prepreg of CFRP and a prepreg of KFRP taken out from a refrigerated storage room are cut into a desired form in a clean room (prepreg precutting process). Then, a severed piece of KFRP prepreg is laid over each side of a severed piece of CFRP prepreg with an adhesive provided therebetween during which time the fibers contained in each of the two KFRP prepregs are kept in an arrangement or orientation skewed substantially at angles of +45° with respect to the direction of the fibers contained in the CFRP prepreg (laying-up process). During that time, the temperature and humidity of the clean room are set, for example, at 18°–20° C. and 70%, respectively.

Figure 5A:
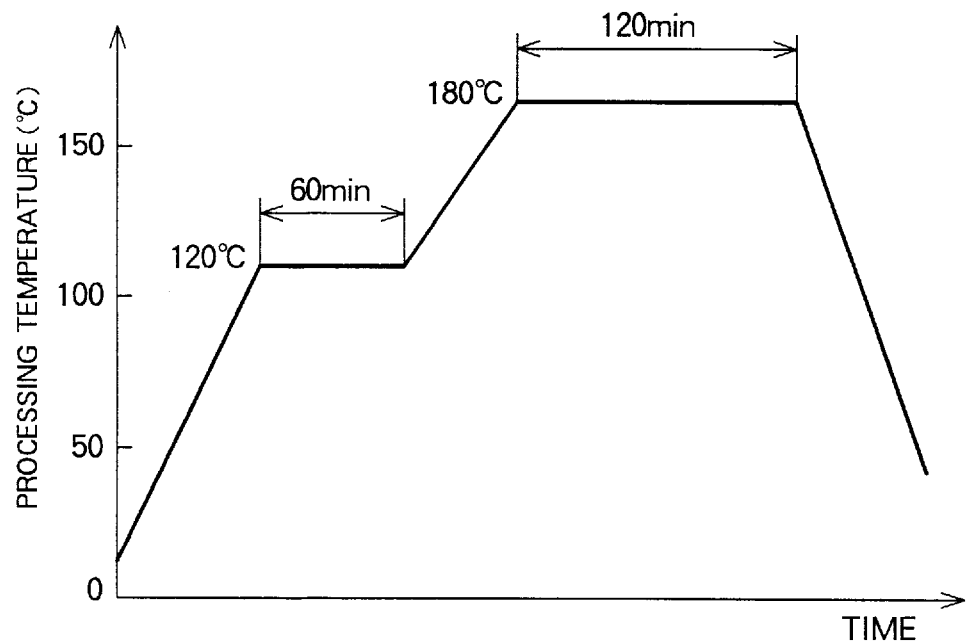
FIGS. 5A, 5B and 5C illustrate a curing program achieved in the manufacturing process of the laminated structure for curing the laminated structure.
Figure 5B:
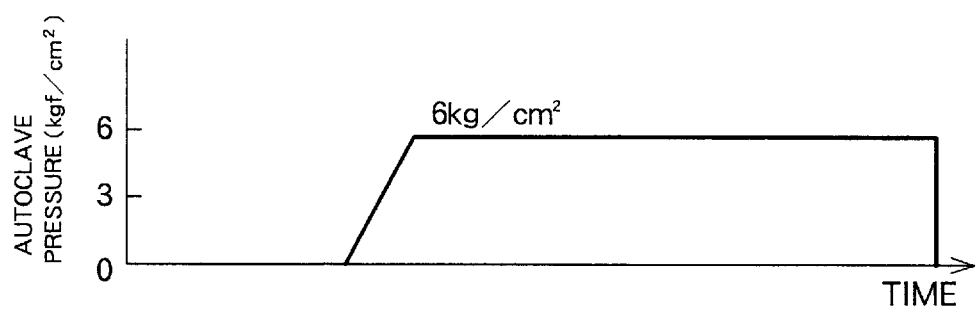
Figure 5C:
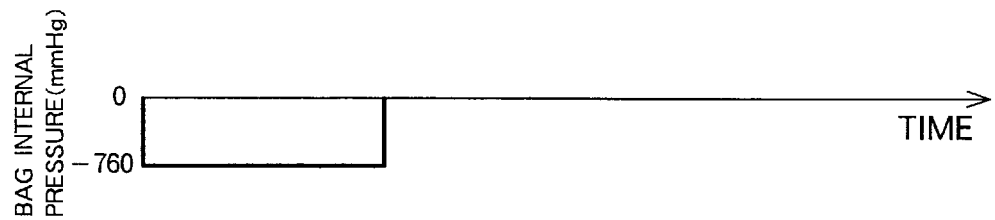

The prepreg lay-up structure or laminate is covered with a nylon film, for example, and the inside of a bag-like nylon film is evacuated (bagging process). Then, the prepreg lay-up structure is heated at a temperature of about 120° C. for about 60 minutes, as shown in FIG. 5A, and after that the pressure is increased to about 6 kgf/cm$^2$, as shown in FIG. 5B while the heating temperature is increased to about 180° C. and, thereafter, heating is continued for about 120 minutes, as shown in FIG. 5A, whereby the prepreg lay-up structure (autoclave curing process) is cured. The cured laminated structure is subjected to visual inspection, if necessary, and thereafter a suitable secondary processing operation, such as trimming, is achieved to convert the laminated structure into a final product.

The thus manufactured CFRP-KFRP laminated structure was tested for impact resistance. The test results will be described below with reference to FIGS. 6–8, in which FIG. 6 shows the shape and configuration of a sample used in the test, FIG. 7 shows the specifications of various samples used in the test, and FIG. 8 is a bar chart showing the test results regarding the specific energy absorption.

Figure 6:
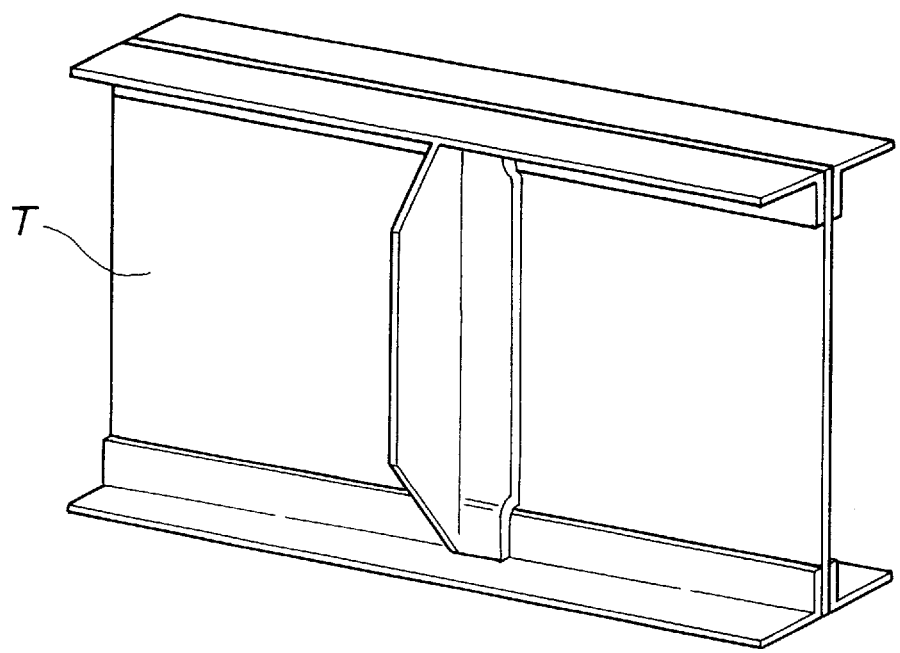
FIG. 6 is a perspective view showing the shape and configuration of a sample used in a test for the energy absorption efficiency.

The sample T shown in FIG. 6 was constructed in the light of a floor keel of an actual body or airframe and had reference values consisting of a width of 250 mm and a height of 190 mm. As shown in FIG. 7, there were six types of material prepared for producing the sample T, namely an aluminum alloy (AL), a CFRP laminate (CFRP), a KFRP laminate (KFRP), a fiberglass reinforced plastic laminate (GFRP), a laminate composed of a CFRP and two KFRPs on opposite sides of the CFRP (CF/KF), and a laminate composed of a CFRP and two GFRPs on opposite sides of the CFRP (CF/GF). The laminating pattern, height and the like of each sample were determined such that the samples of different types of material had substantially the same flexural rigidity in the direction of compression so as to establish an equivalent condition common to all types of material used.

Figure 8:
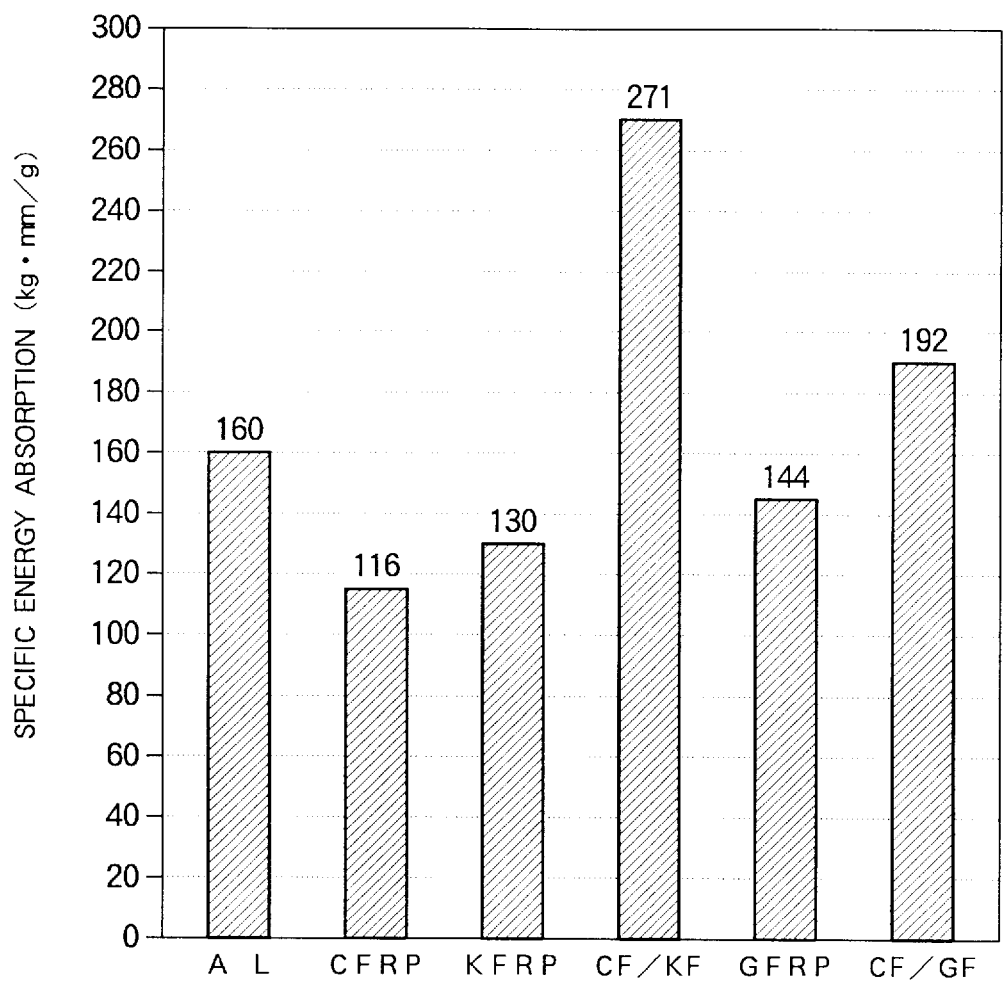
FIG. 8 is a bar chart showing the test results regarding the specific energy absorption.

As shown in FIG. 8, the specific energy absorption (kg-mm/g) of the CF/KF laminate was 271 kg-mm/g which is the greatest among all, much greater than those of only the CFRP or KFRP laminates, and about 1.6 times greater than the AL. The specific energy absorption (kg-mm/g) is obtained by dividing the area (absorbed energy Eab) of a hatched portion shown in FIG. 9, which is defined between a load-deflection curve drawn under application of an impact load and the maximum compressive deflection δmax, by the weight of the structure. In general, the maximum compressive deflection δmax is the deflection at which further energy absorption by the structure cannot be attained due to bottoming or buckling of the structure caused under a compressive force. However, since the test was achieved for the purpose of comparing the various materials, the maximum compressive deflection δmax was set at 90 mm. In the graph shown in FIG. 9, the horizontal axis represents the deflections δ(mm) and the vertical axis represents the load W (kgf).

Figure 10A:
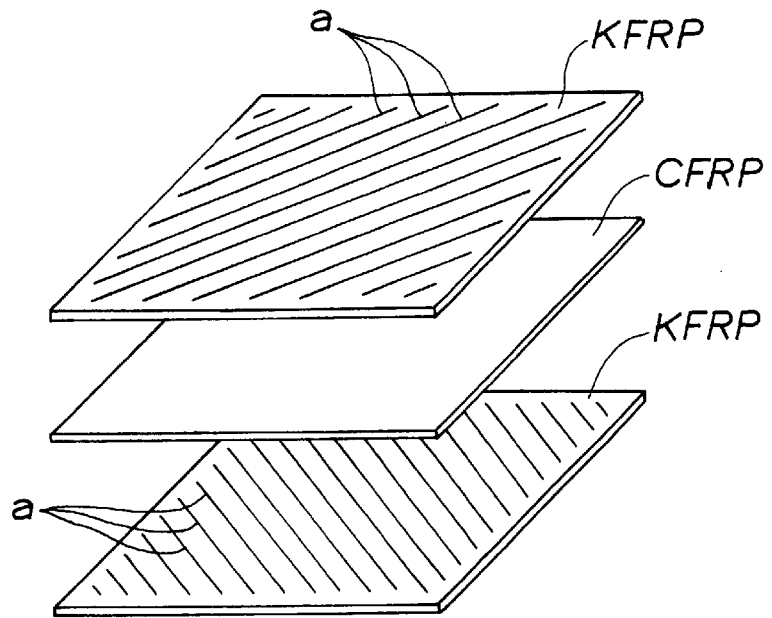
Figure 10B:
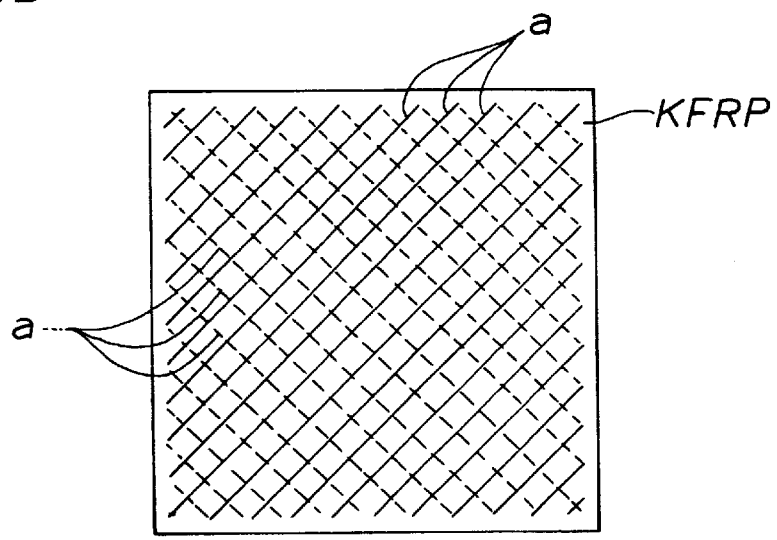
Figure 10C:
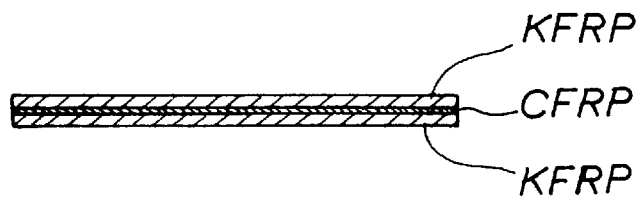

FIGS. 10A, 10B and 10C show a modification of the laminated structure of fiber reinforced plastics shown in FIGS. 1A, 1B and 1C. The modified laminated structure is composed of a central CFRP with carbon fibers laid in a vertical direction parallel to the direction of a load, and a pair of KFRPs bonded to the opposite sides of the CFRP such that aramid fibers (a) in one KFRP are skewed in one direction at an angle of +30° to +60° with respect to the direction of the load, and the aramid fibers (a) in the other KFRP are skewed in the opposite direction at the same angle as the aramid fibers (a) in the first-mentioned KFRP with respect to the direction of the load. In the preferred embodiment shown in FIG. 10, the oblique or skewed angle of the aramid fibers (a) relative to the direction of the load is approximately 45°.

Two preferred embodiments of the fiber reinforced laminated structure have thus been described. Now, a description will be given of the shock-absorbing structures shown in FIGS. 2, 11, 12 and 13.

The shock-absorbing structures of the present invention are used in a crushable zone provided at a portion below the floor of an aircraft. Especially, in the case where the structural material of the shock-absorbing structures is composed of the above-described fiber reinforced plastics, the shock-absorbing structures are able to effectively absorb impact energy and lower the peak value of the impact load even when the impact load is applied in the vertical direction and tends to destroy the shock-absorbing structure. Adequate consideration is given to the shock-absorbing structures so as to avoid a gain in the weight of the shock-absorbing structure.

At the portion below the floor of the aircraft there is disposed a structure which is composed, as shown in FIG. 2, of a keel 1 of FRP and a pair of confronting ribs 2 of FRP that are assembled with the keel 1 in such a posture or orientation that opposite side surfaces of the keel 1 and opposite side surfaces of each of the ribs 2 extend parallel to the direction of an impact load. In the illustrated embodiment, the FRPs have the same laminated structure as shown in FIG. 1 or FIG. 10.

As shown in FIG. 2, at an intersection between the keel 1 and the ribs 2, each rib 2 has at its one end an attachment flange 2a disposed in abutment with one surface of the keel 1 and joined to the keel 1 by a suitable joining means such as a combination of a plurality of rivets 4 and an adhesive. A joint formed by the rivets 4 and the adhesive can absorb a greater energy than a joint formed solely by the adhesive when it is subjected to a vertical impact. The rivets 4 used in combination with the adhesive can prevent the growth or propagation of a crack that may develope and eventually avoid the occurrence of instantaneous separation of the joint.

Figure 12:
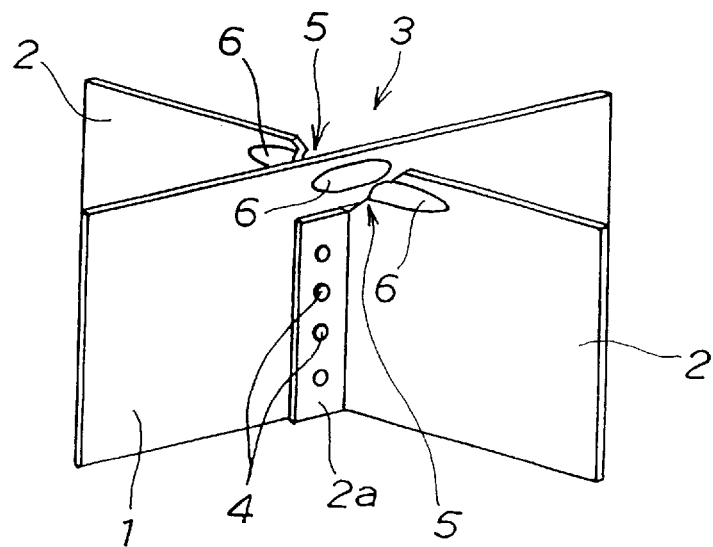
FIG. 12 is a perspective view showing a main portion of a third structural embodiment of the shock-absorbing structure according to the present invention.
Figure 13:
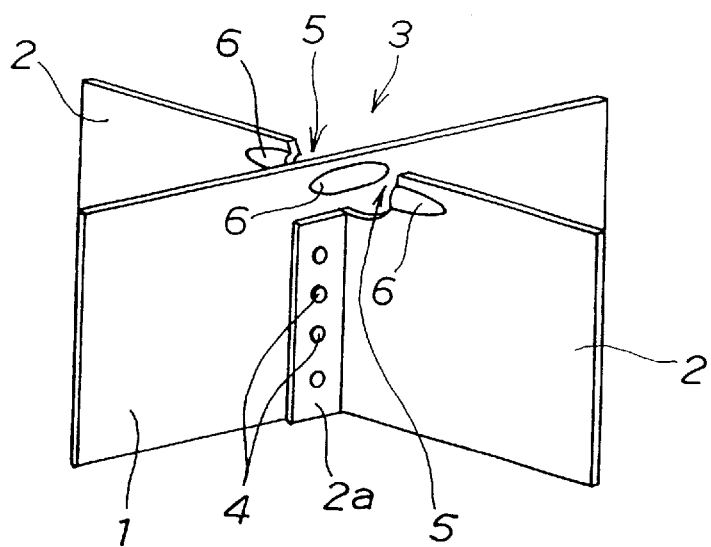
FIG. 13 is a perspective view showing a main portion of a fourth structural embodiment of the shock-absorbing structure according to the present invention.

The ribs 2, 2 each have an upper edge formed with a rectangular cutout recess 5 facing the intersection 3, and a bulged portion 6 adjacent to the cutout recess 5. The bulged portion 6 is composed of a protuberance on one side surface outwardly swelling from one side toward the other side of the rib 2 and has an oblong shape with its major axis extending horizontally. The keel 1 also has an oblong bulged portion 6 extending alongside an upper edge of the keel 1 and located at the intersection 3. The shape of the cutout recesses 5 may be triangular, as shown in FIG. 12, or arcuate, as shown in FIG. 13.

The keel 1 and the ribs 2 are attached at their upper end edges to a floor, not shown, so that they mainly sustain a load applied in a downward direction, and when they are subjected to an impact load exceeding a predetermined value, they are caused to become crushed in a vertical direction to thereby absorb impact energy. The cutout recesses 5 and the bulged portions 6 have the function of first initiating local buckling at the intersection 3 when stress concentration in excess of a predetermined value takes place at the intersection 3 under the vertical impact load, and subsequently absorb the impact load while the entire keel-and-ribs assembly is buckling. The cutout recess 5 and the bulged portion 6 may be provided not only at the upper end edge of the rib 2 as shown in the illustrated embodiment but also at a lower end edge of the rib 2, Alternatively, they may be provided at upper and lower end edges of the rib 2.

The above-described shock-absorbing structure of the present invention was tested for the peak load and the energy absorption efficiency for the purpose of comparing the conventional shock-absorbing structure. Before a description of the test results, general ideas or concepts taken in this embodiment for the peak load and the energy absorption coefficient will be described first with reference to FIG. 9.

When a structure is subjected to an impact load tending to cause structural destruction, the load exerted on the structure first rises rapidly to a peak value as observed at the initial stage of the test and thereafter settles to a constant lower value. Thus, the peak value Wp is called the peak load.

Figure 9:
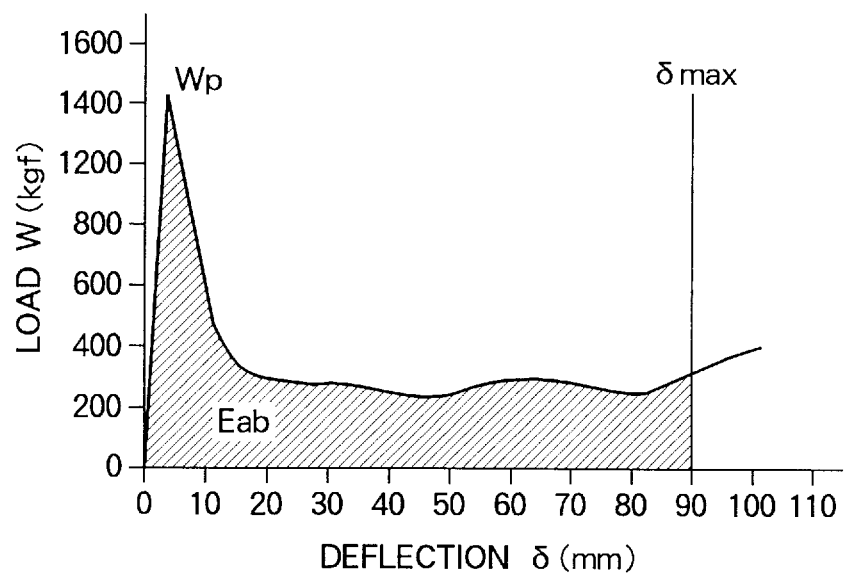
FIG. 9 is a graph illustrative of concept of the energy absorption efficiency and the peak load.

On the other hand, the energy absorption efficiency represents an ability of the structure to absorb impact energy (the product of the load and the deflection) and is defined as being obtained by the area (absorbed energy Eab) of the hatched portion shown in FIG. 9, which is surrounded by the load-deflection curve and the maximum compressive deflection δmax, divided by the impact energy. The maximum compressive deflection δmax is the same as described above with respect to the laminated structure. The load-deflection curve is integrated from 0 to δmax deflection to obtain the absorbed energy Eab which in turn is divided by the impact energy to thereby obtain a value called the energy absorption ratio or efficiency. The energy absorption efficiency thus obtained is represented in terms of percent as described below with reference to FIG. 14.

Figure 14:
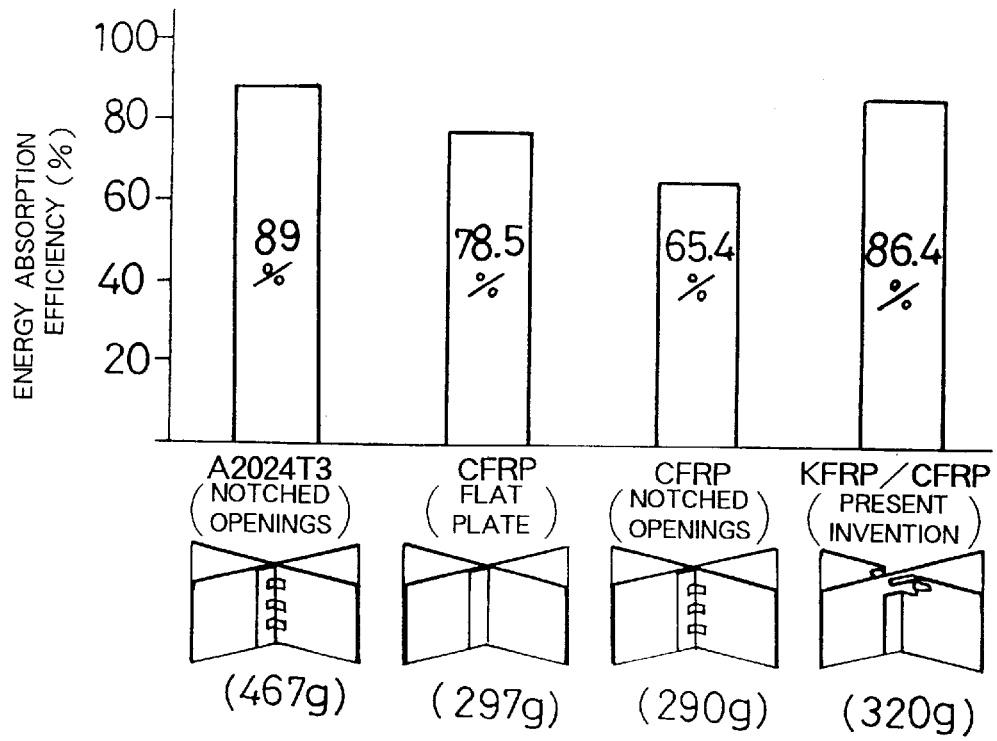
FIG. 14 is a graph showing the results of a comparative test regarding the energy absorption efficiency.
Figure 15:
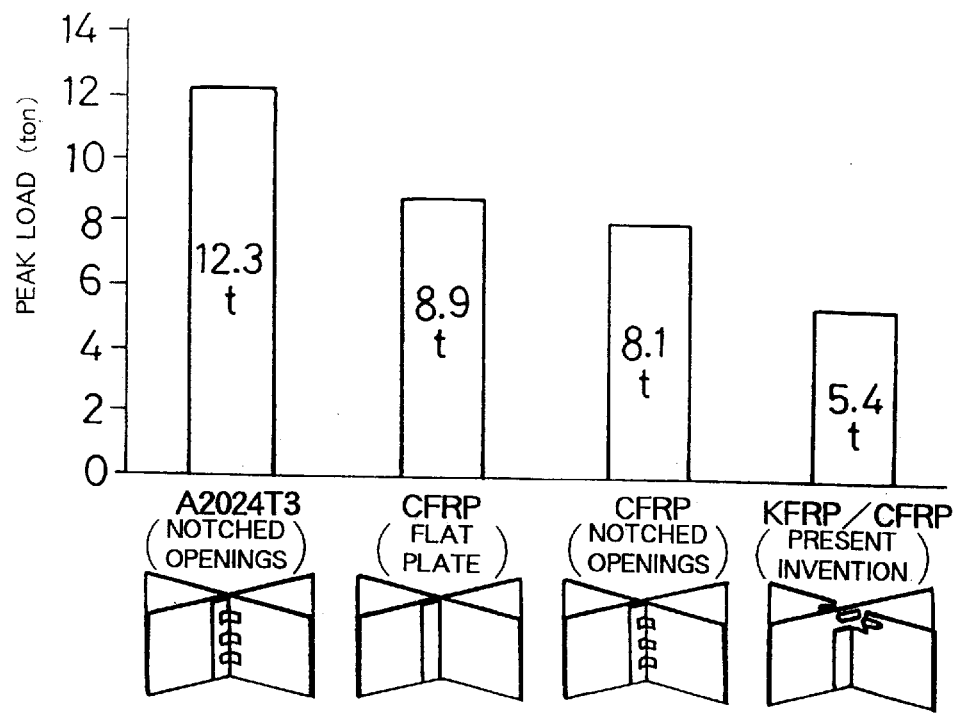
FIG. 15 is a graph showing the result of a comparative test regarding the peak load.

The test results are as shown in FIGS. 14 and 15. Here, FIG. 14 shows the results of a comparative test made for the energy absorption efficiency, and FIG. 15 shows the results of a comparative test made for the peak load. In these test, a vertical collision speed of 8.2 m/s was employed as a test condition. In FIGS. 14 and 15, the horizontal axis contains three comparative examples and one inventive example which are arranged from the left to the right in the order named. The comparative examples and the inventive example are identical to one another in terms of the length, height and thickness of the keel 1 and ribs 2.

Of the comparative examples shown in FIGS. 14 and 15, a first one which is represented by the leftmost bar was made of an aluminum alloy as specified by JIS-A2024T3 and had a plurality of vertically aligned notched openings at the corner of a joint portion, a second one represented by the second bar from the left was composed of a keel of CFRP and ribs of CFRP simply joined crosswise with the CFRP keel, and a third one represented by the second bar from the right was composed of a CFRP keel and CFRP ribs joined together with notched openings formed at the corner of a joint. The rightmost bar represents the structure according to the present invention.

As is apparent from FIG. 14, the structure according to the present invention has an energy absorption efficiency of 86.4% which compares favorably to the energy absorption efficiency 89% of the first comparative example of the aluminum alloy having the notched openings at the joint corner. Furthermore, the peak load of the inventive example is reduced to 5.4 ton which is smaller by about 56% than 12.3 ton of the first comparative example of aluminum alloy having the notched openings at the corner joint and which is smaller by 40% than 8.9 ton of the second comparative example of a simple combination of a planar CFRP keel and planar CFRP ribs.

Figure 16:
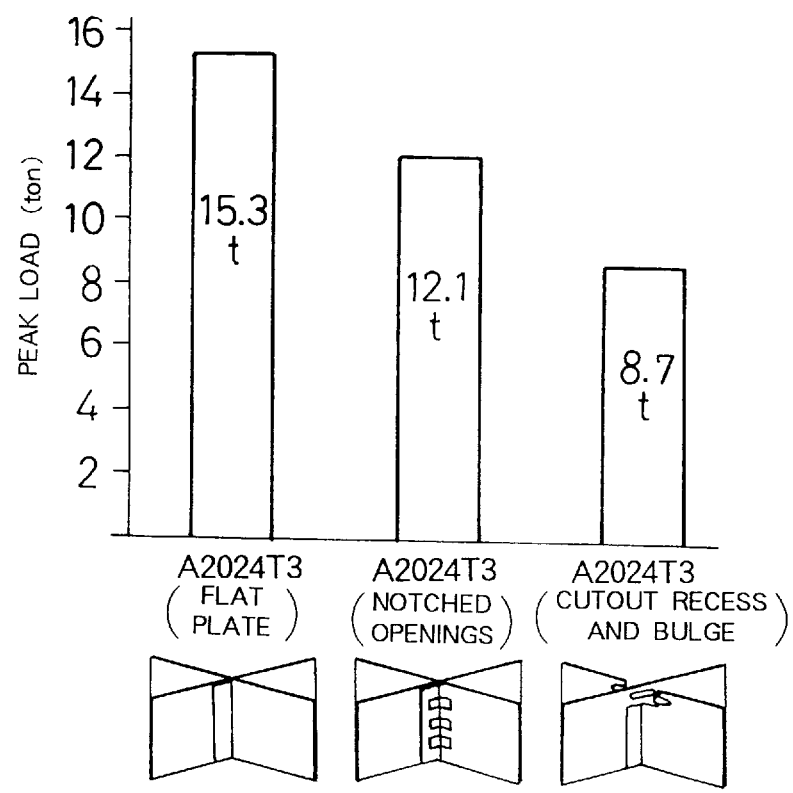
FIG. 16 is a graph showing, for comparative purposes, the effect of the variation of type of structure on the reduction of peak-load.
Figure 17:
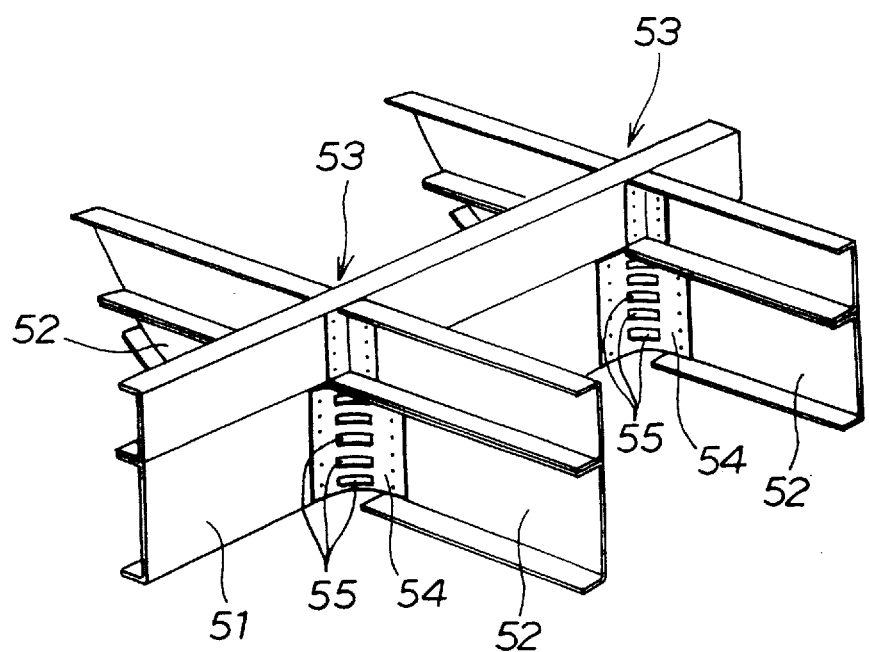
FIG. 17 is a view showing the general construction of an example of conventional shock-absorbing structures.

FIG. 16 shows the effect of the variation of type of structure upon the reduction of the peak load. For comparative purposes, all the structures are made of an aluminum alloy as specified by JIS-A2024T3, so as to eliminate the effect of the difference in material. The structure shown at the left end of the graph is composed of a planar keel and two opposed planar ribs simply joined crosswise with the keel. The structure shown at the center of the graph has notched openings at the corner of a joint, and the structure shown at the right end of the graph is according to the present invention. It appears clear from FIG. 16 that in the case of the structure of this invention, the peak load is reduced to 8.7 ton which is smaller by about 43% than 15.3 ton of the simply joined keel-and-ribs assembly, and which is smaller by about 29% than 12.3 ton of the structure having notched openings at the corner joint. It is therefore understood that by virtue of the effect attained by the combination of the cutout recesses 5 and the bulges 6, the structure of this invention is particularly effective to lower the peak load.

Figure 11:
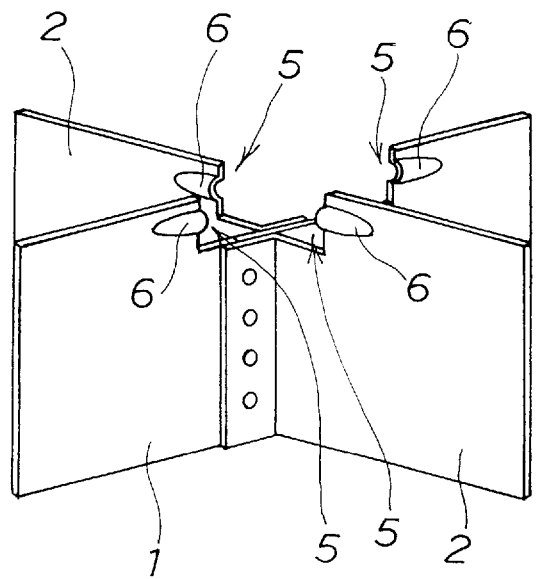
FIG. 11 is a perspective view showing a main portion of a second structural embodiment of the shock-absorbing structure according to the present invention.

As shown in FIG. 14, the weight of the structure of this invention is 320 g which is slightly heavier than 297 g of the structure composed of a simply joined planer keel-and-ribs assembly of CFRP, which is also slightly heavier than 290 g of the structure of CFRP having notched openings at the corner joint, and which is, however, much lighter than 467 g of the structure of the aluminum alloy. In the first structural embodiment shown in FIG. 2, the cutout recess 5 and the bulge portion 6 are provided at an end of the rib 2 adjacent the intersection 3. The cutout recess 5 and the bulged portion 6 also may be provided on the keel 1 side, as shown in FIG. 11. The cutout recess 5 formed in the keel 1 may be of the rectangular shape such as shown in FIG. 11, a triangular shape such as shown in FIG. 12, or an arcuate shape such as shown in FIG. 13.

The foregoing shock-absorbing structures may be used not only in a portion below the floor of the aircraft, but also in a nose portion of the aircraft. In addition to the aircraft, it may be applied in a front, rear or any other part of an automobile which may be subjected to an impact load, so as to absorb the shock or impact.

What is claimed is:

1. A laminated structure of fiber reinforced plastic as at least a planar rib member in a plate form comprising a lower support portion of a floor surface of an airplane for absorbing impact energy from an impact load imposed in a given direction downwardly on the floor surface, characterized in that said laminated structure is composed of a carbon-fiber reinforced planar plastic sheet adapted to be disposed with its opposite surfaces lying parallel to the given direction of the impact load, and a pair of aramid fiber reinforced planar plastic sheets adhered to the opposite surfaces of said carbon-fiber reinforced planar plastic sheet, said carbon-fiber reinforced planar plastic sheet has carbon fibers oriented substantially parallel to the given direction of the impact load, and one of said pair of aramid fiber reinforced planar plastic sheets has a first group of aramid fibers oriented at a given angle of 30° to 60° with respect to the given direction of the impact load, and a second group of aramid fibers oriented substantially at an angle of approximately 90° with respect to the given angle of said first group of aramid fibers and intersecting said first group of aramid fibers and the other of said pair of aramid fiber reinforced planar plastic sheets has a third group of aramid fibers oriented at the same given angle as said first group of aramid fibers with respect to the given direction of the impact load, and a fourth group of aramid fibers oriented at the same angle as said second group of aramid fibers with respect to said third group of aramid fibers and intersecting said third group of aramid fibers.

2. A laminated structure of fiber reinforced plastic as at least a planar rib member in a plate form comprising a lower support portion of a floor surface of an airplane for absorbing impact energy from an impact load imposed in a given direction downwardly on the floor surface, characterized in that said laminated structure is composed of a carbon-fiber reinforced planar plastic sheet adapted to be disposed with its opposite surfaces lying parallel to the given direction of the impact load, and a pair of aramid fiber reinforced planar plastic sheets adhered to the opposite surface of said carbon-fiber reinforced planar plastic sheet, said carbon-fiber reinforced planar plastic sheet has carbon fibers oriented substantially parallel to the given direction of the impact load, and one of said pair of aramid fiber reinforced planar plastic sheets has aramid fibers oriented at a given angle of 30° to 60° with respect to the given direction of the impact load, and the other of said pair of aramid fiber reinforced planar plastic sheets has aramid fibers oriented substantially at an angle of 90° with respect to the given angle of said aramid fibers of said one aramid fiber reinforced plastic sheet.

3. A laminated structure according to claims 1 or 2, wherein said given angle of orientation of said aramid fibers with respect to the direction of the impact load is substantially ±45°.

4. A laminated structure of fiber reinforced plastic for absorbing impact energy, characterized in that said laminated structure is composed of a carbon-fiber reinforced plastic sheet adapted to be disposed with its opposite surfaces lying parallel to the direction of an impact load, and a pair of aramid fiber reinforced plastic sheets adhered to the opposite surfaces of said carbon-fiber reinforced plastic sheet, each of said aramid fiber reinforced plastic sheets has aramid fibers oriented at a given angle of 30° to 60° with respect to the direction of the impact load, a plurality of said laminated structures are assembled crosswise such that outer surfaces of the respective aramid fiber reinforced plastic sheets are parallel with the direction of the impact load, and said assembled plurality of laminated structures have a cutout recess and a bulged portion formed in at least one of said laminated structure at an end thereof adjacent to an intersection of the assembled plurality of laminated structures.

5. A laminated structure of fiber reinforced plastic for absorbing impact energy, characterized in that said laminated structure is composed of a carbon-fiber reinforced plastic sheet adapted to be disposed with its opposite surfaces lying parallel to the direction of an impact load, and a pair of aramid fiber reinforced plastic sheets adhered to the opposite surfaces of said carbon-fiber reinforced plastic sheet, each of said aramid fiber reinforced plastic sheets has aramid fibers oriented at a given angle of 30° to 60° with respect to the direction of the impact load, each of said pair of aramid fiber reinforced plastic sheets has a first group of aramid fibers oriented at a said given angle of +30° to +60° with respect to the direction of the impact load, and a second group of aramid fibers oriented at a said given angle of −30° to −60° wit respect to the direction of the impact load and intersecting said first group of aramid fibers, a plurality of said laminated structures are assembled crosswise such that outer surfaces of the respective aramid fiber reinforced plastic sheets are parallel wit the direction of the impact load, and said assembled plurality of laminated structures have a cutout recess and a bulged portion formed in at least one of said laminated structures at an end thereof adjacent to an intersection of the assembled plurality of laminated structures.

6. A laminated structure of fiber reinforced plastic for absorbing impact energy, characterized in that said laminated structure is composed of a carbon-fiber reinforced plastic sheet adapted to be disposed with its opposite surfaces lying parallel to the direction of an impact load, and a pair of aramid fiber reinforced plastic sheets adhered to the opposite surfaces of said carbon-fiber reinforced plastic sheet, each of said aramid fiber reinforced plastic sheets has aramid fibers oriented at a given angle of +30° to +60° with respect to the direction of the impact load, and the other of said pair of aramid fiber reinforced plastic sheets has aramid fibers oriented at a said given angle of −30° to −60° with respect to the direction of the impact load, a plurality of said laminated structures are assembled crosswise such that outer surfaces of the respective aramid fiber reinforced plastic sheets are parallel with the direction of the impact load, and said assembled plurality of laminated structures have a cutout recess and a bulged portion formed in at least one of said laminated structures at an end thereof adjacent to an intersection of the assembled plurality of laminated structures.

7. A laminated structure according to claim 4, 5 or 6, wherein said cutout recess has at least one of a rectangular shape, a triangular shape and an arcuate shape.

8. A laminated structure according to claim 7, wherein said bulged portion has at least one of either an oval shape having a minor axis aligned with the direction of the impact load or an arcuate shape.

9. A laminated structure according to claim 7 for installation on a movable body for absorbing an impact applied to the movable body.

10. A laminated structure according to claim 7 for installation in an aircraft in a portion located below the floor of the aircraft.

11. A laminated structure according to claim 4, 5 or 6, wherein said bulged portion has at least one of either an oval shape having a minor axis aligned with the direction of the impact load or an arcuate shape.

12. A laminated structure according to claim 11 for installation on a movable body for absorbing an impact applied to the movable body.

13. A laminated structure according to claim 11 for installation in an aircraft in a portion located below the floor of the aircraft.

14. A laminated structure according to any one of the preceding claims 4, 5 or 6 for installation on a movable body for absorbing an impact applied to the movable body.

15. A laminated structure according to any one of the preceding claims 4, 5 or 6 for installation in an aircraft in a portion located below the floor of the aircraft.

* * * * *

UNITED STATES PATENT AND TRADEMARK OFFICE
CERTIFICATE OF CORRECTION

PATENT NO. : 5,843,558
DATED : December 1, 1998
INVENTOR(S) : Y. Yoshizaki et al.

Page 1 of 1

It is certified that error appears in the above-identified patent and that said Letters Patent is hereby corrected as shown below:

Column 10,
Line 28, delete "wit" and substitute -- with --.
Line 33, delete "wit" and substitute -- with --.

Signed and Sealed this

Seventh Day of May, 2002

Attest:

*Attesting Officer*

JAMES E. ROGAN
*Director of the United States Patent and Trademark Office*